United States Patent [19]
Blackmon

[11] 3,907,963
[45] Sept. 23, 1975

[54] MELT EXTRUSION
[75] Inventor: Lawrence E. Blackmon, Foley, Ala.
[73] Assignee: Monsanto Company, St. Louis, Mo.
[22] Filed: June 29, 1973
[21] Appl. No.: 375,228

Related U.S. Application Data
[63] Continuation-in-part of Ser. No. 168,286, Aug. 2, 1971, abandoned.

[52] U.S. Cl............................ 264/349; 264/211
[51] Int. Cl.² ........................................ B29B 1/04
[58] Field of Search ............... 264/176 F, 211, 349; 425/208, 209; 259/510; 260/857 PE

[56] References Cited
UNITED STATES PATENTS

| | | | |
|---|---|---|---|
| 3,219,320 | 11/1965 | Sutter | 259/5 |
| 3,329,557 | 7/1967 | Magat et al. | 161/172 |
| 3,382,305 | 5/1968 | Breen | 264/171 |
| 3,518,337 | 6/1970 | Nicolas | 264/176 F |
| 3,767,754 | 10/1973 | Manning et al. | 264/349 |

FOREIGN PATENTS OR APPLICATIONS

| | | | |
|---|---|---|---|
| 1,162,813 | 2/1964 | Germany | 259/7 |
| 43-16904 | 7/1968 | Japan | 264/349 |

Primary Examiner—Jay H. Woo
Attorney, Agent, or Firm—Stanley M. Tarter

[57] ABSTRACT

In a screw mixer, interrupted feed-compression flights radially extending from the root of the screw along helical lines intermesh with interrupted feed-restraining flights radially extending from the barrel along reverse complementing helical lines with respect to the disposition of the feed-compression flights. As the screw is rotated, intensive shearing of the material being axially forwarded is accomplished in alternation with periods of substantially lower or no shearing. The apparatus is quite suitable for mixing and kneading a waxlike substance into a moving stream of molten synthetic fiber-forming polymer just prior to forming filaments therefrom.

3 Claims, 5 Drawing Figures

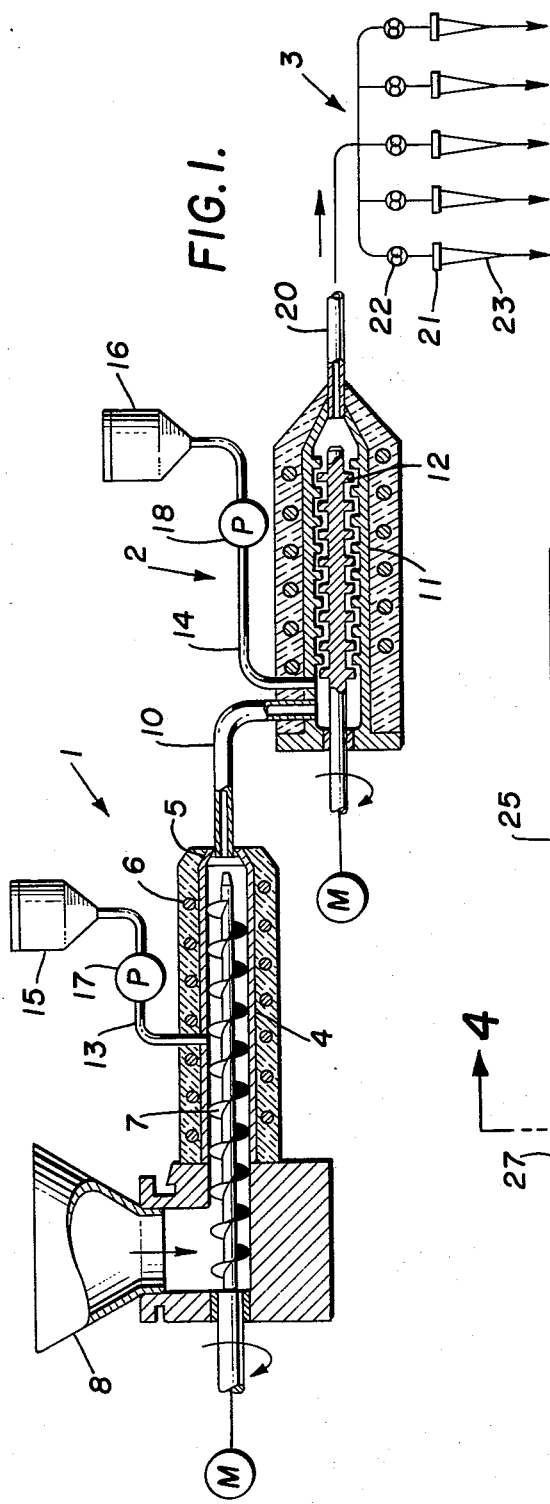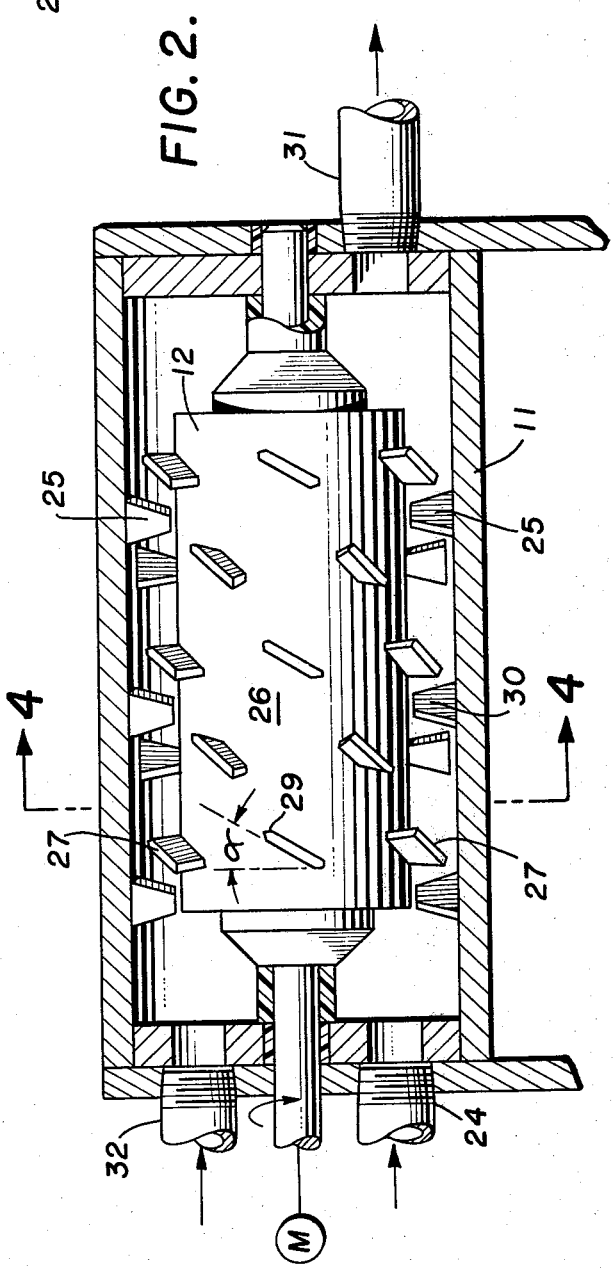

MELT EXTRUSION

REFERENCE TO RELATED APPLICATION

This application is a continuation-in-part application of application Ser. No. 168,286, filed Aug. 2, 1971 and now abandoned.

BACKGROUND OF THE INVENTION

To render synthetic filaments static resistant it is quite common practice to incorporate in the filaments certain additives either during the synthetic polymer formation or into the polymer being moved to a filament forming means. Common additives, especially for polyamide filaments, have wax-like characteristics and include high molecular poly(alkylene ethers) and various other compounds having at least one long chain of repeating units of alkylene oxide. It has been found that proper distribution of the wax-like antistatic additive is of utmost importance in providing optimum protection against build-up of static electricity on fabric made of the synthetic filaments. The wax must not be homogeneously blended in the polymer. Rather, it should be dispersed as a separate and distinct phase at levels of at least about 2 percent and up to at least about 10 percent by weight. Not only should the wax be uniformly blended as a separate phase, the particles of wax should also be in the form of microscopic, elongated particles of specified particle size which are oriented in overlapping relationship with their longest dimension parallel to the major axis of the filament. Particles of the wax having a smaller diameter than 0.05 micron or a length less than 3 microns are not entirely suitable. The preferred size range is 0.1 to 1.0 micron diameter. The length of the particles should be at least 15 microns, preferably 40 to 50 microns.

Difficulties are encountered in blending the wax and polymer to achieve this particle size and distribution using known and conventional equipment. The present invention provides method and apparatus for screw melting polymer and incorporating the anti-static wax in the polymer in a simple and economical manner yet insuring the presence of the correct particle size of the wax as a distinct phase in filaments made thereof.

SUMMARY OF THE INVENTION

Apparatus for mixing and kneading materials is provided wherein a screw is rotatably journalled in the barrel of a screw mixer. A series of feed-compression flights radially extends from the root or shaft of the screw. Each of these flights is composed of a plurality of circumferentially spaced spoke-like blades. A shearing surface is provided on the trailing edge of the screw blades. A series of fixed feed-resisting flights radially extends from the barrel. Each barrel flight is composed of a plurality of circumferentially spaced fixed spoke-like blades. A shearing surface is provided on the leading edge of the barrel blades. The screw blades intermesh with the barrel blades such that as the screw is rotated intensive shearing of the material being axially forwarded in the apparatus is accomplished with interrupted periods of little or substantially no shearing. The apparatus is quite suitable for mixing and kneading a wax-like substance into a moving stream of molten synthetic fiber-forming polymer or the like.

The apparatus may be used in a process for melt extrusion of filaments of synthetic polymers including the steps of feeding a synthetic polymer in solid particulate form through a screw melter. Antistatic wax is injected into the resulting molten polymer. Thereafter, the polymer and wax are conveyed through the screw mixer. The resulting kneaded mass is metered through a spinneret to form textile continuous filaments.

BRIEF DESCRIPTION OF THE DRAWING

FIG. 1 is a vertical section, more or less schematically illustrating the apparatus and method according to a preferred form of the invention.

FIG. 2 is a more detailed section of a screw mixer, being slightly different from the one shown in the first figure.

DETAILED DESCRIPTION

Figure 3:
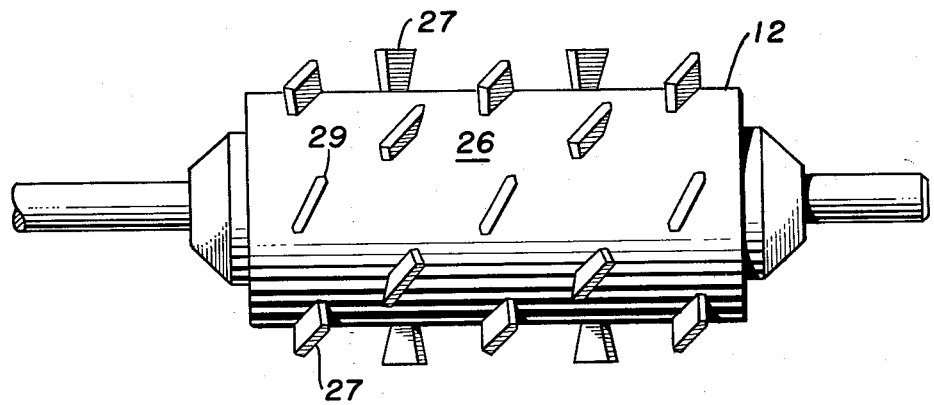
FIG. 3 is a side elevational view of the screw of FIG. 2.

With reference to FIG. 1, numeral 1 generally denotes a screw melter for melting polymer in particulate form and for forwarding the molten polymer through an in-line screw mixer 2 to a filament forming device 3. The screw melter 1 consists of a barrel 4 of suitable metal having a smooth inner bore of uniform diameter up to the convergent extrusion tip 5. The barrel is heated by electric coil 6 in order to melt the material passed therethrough.

Within the barrel there is fitted a screw 7 of conventional type which is journalled for rotation. Means for rotatably driving the screw can be a suitable motor. A feed hopper 8 is provided for supplying particulate polymeric material, such as polyamide or polyester flake. Although not shown, the screw melter 1 may be provided with suitable means such as vacuum means for removing oxygen and volatiles, as well as with means for passing inert gas, as for example nitrogen, prior to operation.

The polymer is melted in the screw melter 1 and forwarded through line 10 to the screw mixer 2. As more particularly described below, the mixer comprises a heated stationary cylindrical barrel 11 and a screw 12 operatively positioned for rotation within the barrel and is adapted for receiving and discharging thermoplastic material in a plastic state.

A wax-like material may be brought into the melting and conveying system either through line 13 or line 14, or both at the same time. The waxy substance is stored in reservoirs 15 and/or 16 which may be heated to bring the wax in flowable state, if necessary. Pumps 17 or 18 are used to inject the wax into the stream of polymer in controlled amounts. As indicated above, the amount of wax may be in the range of about 2–10 percent by weight of the polymer.

Within the screw mixer the wax and polymer are kneaded such that the wax is uniformly finely dispersed in the polymer as a separate and distinct phase. The resulting mixture is conducted through a conduit 20 and thence through a distributing manifold to a spinneret 21. The material is metered through the spinneret by means of pump 22 to form extruded filaments 23. A plurality of spinning positions are shown. These filaments are gathered into a threadline that is packaged and processed into suitable textile-grade filaments. In these filaments the wax is dispersed as a separate and distinct phase with an elongated rod-like shape of 0.05 to 3 microns in diameter and 15–50 microns in length.

With reference now to FIG. 2, an entrance port 24 is provided in the screw mixer. Molten polymer that may or may not have wax premixed with it enters port 24. The barrel 11 has a bore of uniform diameter except for the presence of the plurality of fixed flights 25 radially extending inward from the barrel. These flights are interrupted so that each flight is composed of a plurality of circumferentially spaced fixed spoke-like blades. Preferably, there are about 3 to 12 such blades circumferentially positioned along each of the helical lines to form a flight, the helical lines being parallel. The blades are angularly positioned so that the flight face is preferably upright and flat. The blades partially and temporarily restrain the movement of the molten mass through the screw mixer. The length of the mixing portion of the barrel may be from 1 to 10 times the inside diameter of the barrel or longer if desired. The number of flights may vary from 3 to 20.

The screw root 26 has a series of feed-compression flights radially extending outward therefrom along parallel helical lines to form flights. Each of the flights is interrupted to provide a plurality of circumferentially spaced spoke-like blades 27. A shearing surface 29 is provided on the trailing edges of these screw blades. Likewise, a corresponding shearing surface 30 is provided on the leading edge of the barrel blade. As illustrated, the screw is not continuously full flighted but has a plurality of interrupted flight portions with constant channel depth. The helical angle $\alpha$ of the screw blade will normally be from 15–45° and the helical angle of the barrel blade will be a corresponding reverse angle, namely from −15° to −45°. The helical angle of the flight will generally approximate the screw blade angle.

It is seen that the screw blades intermesh with the barrel blades. As the screw is rotated intensive shearing of the material being axially forwarded in the apparatus is accomplished by the scissoring action resulting by the moving of the trailing edges of the screw blades across the leading edges of the barrel blade. The distance of closest approach of these edges may vary depending on the intensity of the desired shearing. In the preferred operation separation of one-eighth inch to one thirty-second inch is suitable. The shearing is interrupted with longer periods of substantially lower or no shearing. The material leaves the screw mixer 2 through port 31. When desired, the additive can be incorporated into the molten polymer through line 32. The material leaving the screw mixer is ready to be spun into textile grade filaments using conventional apparatus.

In FIG. 3 the screw is shown removed from the barrel. The disposition of the blades around the root of the screw is better seen. As the screw is turned, the material in the apparatus is compressed by the blades and is caused to move under pressure through the apparatus.

Figure 4:
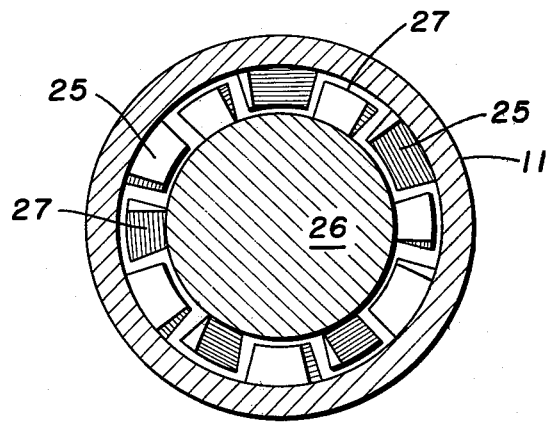
FIG. 4 is a vertical section taken along line 4—4 of FIG. 2.

In FIG. 4 five blades per flight are seen extending from the screw root 26. A like number of blades extend from the barrel per flight. The shearing surface of the blades at their closest point of approach exercises a scissoring action on the polymeric material and contributes effectively to the desired non-homogeneous dispersion of the wax in the polymer. In the illustration for each turn of the screw there are 25 shearings of the material being moved through the screw mixer 2 for each flight.

Figure 5:
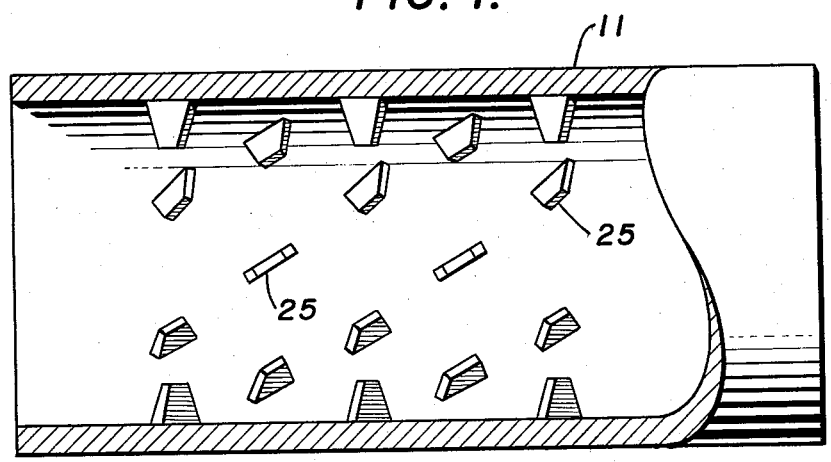
FIG. 5 is a detailed view partly in central section of the barrel of the screw mixer of FIG. 2.

With reference to FIG. 5, the barrel 11 and its series of interrupted fixed flights 25 can readily be seen, the screw having been removed for purposes of illustration.

The polymer processed by the present method and apparatus can be any suitable thermoplastic polymer including the synthetic polymers such as: (1) polyamides, also called nylon, which are any long chain synthetic polycarbonamide having recurring amide groups as an integral part of the polymer chain; specific examples include polymeric hexamethylene adipamide (nylon-66), polymeric epsilon-caprolactam (nylon-6), etc.; (2) linear polyesters, made of a fiber-forming substance of any long chain synthetic polymer composed of at least 85 percent by weight of an ester of a dihydric alcohol and an alicyclic or aromatic dicarboxylic acid, such as terephthalic acid; (3) polyurethanes; (4) polyureas; (5) polycarbonates; (6) acrylics; (7) modacrylics; (8) crystalline polymeric hydrocarbons; (9) vinyl chloride, vinylidene chloride, vinyl acetate and various copolymers thereof.

Suitable additives may be incorporated in polymer using the present method and apparatus. $TiO_2$, colorants, plasticizers and other general classes of additives can be compounded in the polymer. But, the present invention can most advantageously be used to incorporate a heat-stable wax-like material that imparts antistatic properties to filaments made therefrom. Chemically speaking, the wax materials are polyalkoxylated compounds. The preferred material is a polyalkoxylated triglyceride of a saturated hydroxy fatty acid having 12 to 30 carbon atoms as disclosed in U.S. Pat. No. 3,388,104. The polyoxyalkylene portion of the glyceride should be in the molecular weight range of 1,000 to 30,000 and may be ethoxy, propoxy, etc. Also, poly(alkylene ethers) and derivatives thereof may be incorporated. These additives are ethylene oxide, propylene oxide, etc. condensation products. Furthermore, polyalkoxylated saturated di-fatty alkyl amines wherein the two fatty alkyl substituents have 10 to 30 carbon atoms are useful. Combination of additives is contemplated. N-alkylated polyamides may also be used as antistatic additives.

The practice of this invention will now be further illustrated by the following example.

EXAMPLE

Particulate flake polyhexamethylene adipamide (nylon-66) was introduced in an extrusion device similar to that schematically shown in FIG. 1. Both the rate of introduction of flake and material and extrusion of molten polymer were maintained at 400 pounds per hour. A wax of polyethoxylated glyceryl tri(hydroxystearate) with 200 moles of ethylene oxide per mole of compound was heated to 110°C. to melt same and was added in the screw melter by pumping the molten material into the screw melter at a point where the polymer had become molten. The amount of wax metered into the polymer was 6 per cent by weight of the polymer. The molten mass was then passed through the screw mixer and the wax was further dispersed in the polymer. The resulting mixture was spun into yarn having a relative viscosity of 36. The yarn was gear textured and was tufted into a backing material to make a carpet. It was found that the carpet had a reduced tendency to accumulate static electricity. The temperature of the material leaving the screw melter was 260°C. and leaving the screw mixer was 265°C. The screw was rotated at 70 rpm. The diameter of the barrel was 3 inches and the length was 11 inches. The total volume clearance between the barrel and screw was 9.5 cubic inches. The blades intermeshed by a radial distance of five-eighths inch. There were 12 flights with 5 circumferentially interrupted blades per flight. The helix angle of the screw blades was 30° and the helix angle for the barrel blade was −30°. The clearance between the leading edges of the barrel blades and the trailing edges of the screw blades at the point of closest approach was one-sixteenth inch.

By making yarn using the apparatus of FIG. 1 but without the use of the screw mixer, it was found that yarn made this way did not possess the excellent antistatic properties of the yarn processed in accordance with the present invention.

Important also was the observation that the use of the screw mixer resulted in better spinning performance of the yarn. Without the screw mixer in-line between the screw melter and spinning machine the relative viscosity of the yarn varied significantly from one position to another and along a given threadline over a period of time. However, with the screw mixer in use excellent relative viscosity positional uniformity was observed.

Furthermore, it was noted that without the screw mixer in use, the filters in the spinning packs for the spinneret tended to clog readily thereby causing an undesirable buildup of pack pressure and necessitating pack change in a relatively short period of time. However, with the screw mixer herein in use there was significantly less clogging of the pack filter and longer periods between necessary pack changes.

I claim:

1. In the process of incorporating a wax into polyamide filaments including the steps of melting polyamide in solid particulate form and conveying the resulting molten polymer in a confined zozne, injecting a polyalkoxylated wax compound into the molten polyamide in the amount of about 2–10 percent by weight, and thereafter extruding the resulting mixture into textile continuous filaments, the improvement comprising subjecting the mixture of molten polyamide and wax compound before extrusion to a plurality of intensive scissor shearings (intermittently interrupted by) in alternation with longer periods of substantially no shearing, whereby the wax compound is dispersed as a separate and distinct phase in the filaments with an elongated rod size of 0.05 to 3 microns in diameter and 15–50 microns in length.

2. The process of claim 1 wherein the polymer is nylon-66.

3. The process of claim 2 wherein the wax has at least one long chain of repeating units of alkylene oxide.

* * * * *